US012801554B2

(12) United States Patent
Kidd et al.

(10) Patent No.: US 12,801,554 B2
(45) Date of Patent: Nov. 17, 2026

(54) SERVER INFORMATION HANDLING SYSTEM OPPOSING PLANE INTERPOSER SYSTEM

(71) Applicant: Dell Products L.P., Round Rock, TX (US)

(72) Inventors: Owen Kidd, Cedar Park, TX (US); Douglas Haunsperger, Round Rock, TX (US); Andrew Barada, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 17 days.

(21) Appl. No.: 19/000,374

(22) Filed: Dec. 23, 2024

(65) Prior Publication Data

US 2026/0178530 A1 Jun. 25, 2026

(51) Int. Cl.

| | |
|---|---|
| ***G06F 13/40*** | (2006.01) |
| ***G06F 8/70*** | (2018.01) |
| ***G06F 8/71*** | (2018.01) |
| ***G06F 8/76*** | (2018.01) |
| ***G06F 9/445*** | (2018.01) |
| ***G06F 9/448*** | (2018.01) |
| ***G06F 9/54*** | (2006.01) |
| ***G06F 11/07*** | (2006.01) |
| ***G06F 11/14*** | (2026.01) |

(52) U.S. Cl.

CPC .. *G06F 13/4068* (2013.01); *G06F 2213/0012* (2013.01); *G06F 2213/0026* (2013.01)

(58) Field of Classification Search

CPC .......................... H01R 13/6474; H05K 7/1409

See application file for complete search history.

(56) References Cited

U.S. PATENT DOCUMENTS

| | | | | |
|---|---|---|---|---|
| 2005/0101188 A1* | 5/2005 | Benham | H01R 13/6474 439/620.01 |
| 2005/0157481 A1* | 7/2005 | Barsun | H05K 7/1409 361/810 |
| 2009/0017664 A1* | 1/2009 | McAlonis | H05K 1/142 439/326 |
| 2018/0294076 A1* | 10/2018 | Farkas | H05K 3/3405 |
| 2021/0019270 A1* | 1/2021 | Li | G06F 13/1668 |
| 2022/0181810 A1* | 6/2022 | Xu | H05K 7/1452 |
| 2024/0136743 A1 | 4/2024 | Kidd | |

* cited by examiner

*Primary Examiner* — Getente A Yimer

(74) *Attorney, Agent, or Firm* — Terrile, Cannatti & Chambers, LLP; Stephen A. Terrile

(57) ABSTRACT

A baseboard system for an information handling system. The baseboard system includes a plurality of components and an opposing plane interposer system, the opposing plane interposer system including a primary circuit board, the primary circuit board including a plurality of slots and a primary landing pad portion, the plurality of slots being installed on a top side of the primary circuit board, the primary landing pad portion being installed on a bottom side of the primary circuit board; and, an integrated circuit interposer circuit board, the integrated circuit interposer circuit board including an integrated circuit component and an interposer landing pad portion, the integrated circuit component being installed on a bottom side of the integrated circuit interposer circuit board, the interposer landing pad portion being installed on a top side of the integrated circuit interposer circuit board.

18 Claims, 7 Drawing Sheets

SERVER INFORMATION HANDLING SYSTEM OPPOSING PLANE INTERPOSER SYSTEM

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for providing a server type information handling system with an opposing plane interposer system.

In one embodiment, the invention relates to an opposing plane interposer system for use with an information handling system, comprising: a primary circuit board, the primary circuit board including a plurality of slots and a primary landing pad portion, the plurality of slots being installed on a top side of the primary circuit board, the primary landing pad portion being installed on a bottom side of the primary circuit board; and, an integrated circuit interposer circuit board, the integrated circuit interposer circuit board including an integrated circuit component and an interposer landing pad portion, the integrated circuit component being installed on a bottom side of the integrated circuit interposer circuit board, the interposer landing pad portion being installed on a top side of the integrated circuit interposer circuit board, the top side of the integrated circuit interposer circuit board mating with the bottom side of the primary circuit board interposer landing pad portion.

In another embodiment, the invention relates to a baseboard system for an information handling system comprising: a plurality of components; and an opposing plane interposer system, the opposing plane interposer system comprising a primary circuit board, the primary circuit board including a plurality of slots and a primary landing pad portion, the plurality of slots being installed on a top side of the primary circuit board, each of the plurality of components being installed on respective slots of the plurality of slots, the primary landing pad portion being installed on a bottom side of the primary circuit board; and, an integrated circuit interposer circuit board, the integrated circuit interposer circuit board including an integrated circuit component and an interposer landing pad portion, the integrated circuit component being installed on a bottom side of the integrated circuit interposer circuit board, the interposer landing pad portion being installed on a top side of the integrated circuit interposer circuit board, the top side of the integrated circuit interposer circuit board mating with the bottom side of the primary circuit board interposer landing pad portion.

In another embodiment, the invention relates to a system comprising: a chassis; a processor contained within the chassis; a data bus coupled to the processor; a plurality of components contained within the chassis; and, an opposing plane interposer system, the opposing plane interposer system comprising a primary circuit board, the primary circuit board including a plurality of slots and a primary landing pad portion, the plurality of slots being installed on a top side of the primary circuit board, each of the plurality of components being installed on respective slots of the plurality of slots, the primary landing pad portion being installed on a bottom side of the primary circuit board; and, an integrated circuit interposer circuit board, the integrated circuit interposer circuit board including an integrated circuit component and an interposer landing pad portion, the integrated circuit component being installed on a bottom side of the integrated circuit interposer circuit board, the interposer landing pad portion being installed on a top side of the integrated circuit interposer circuit board, the top side of the integrated circuit interposer circuit board mating with the bottom side of the primary circuit board interposer landing pad portion.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
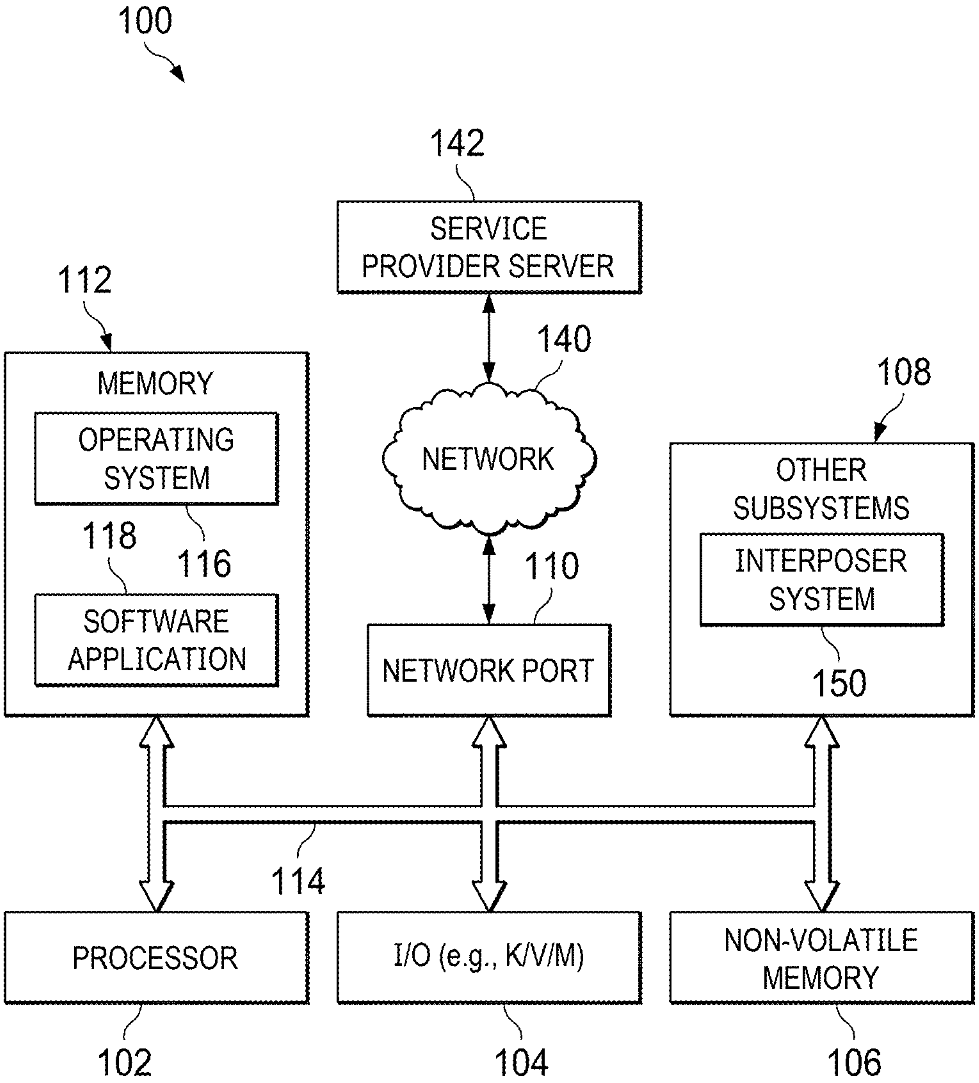
FIG. 1 shows a general illustration of components of an information handling system as implemented in the system and method of the present invention.

Various aspects of the present disclosure include an appreciation that server type information handling system structural designs are becoming increasingly large as a function of growing component size and increasing heat loads within the system. Various aspects of the present disclosure include an appreciation that these increasingly large structural designs are growing outside of supportability in standard rack form factors. Various aspects of the present disclosure include an appreciation that it would be desirable to maintain these structural designs within standard rack form factors while still accommodating for the number of power distribution units (PDUs) needed to power these systems. Various aspects of the present disclosure include an appreciation that it would be desirable to compress the information handling system structural design to provide a solution viable for a broad variety of customer environments and use cases.

Various aspects of the present disclosure include an appreciation that it is known to provide information handling systems with a plurality of components. Various aspects of the present disclosure include an appreciation that graphics processing unit (GPU) modules are one example of a component that is included within an information handling system. Various aspects of the present disclosure include an appreciation that it may be desirable to provide an information handling system with an array of components. Various aspects of the present disclosure include an appreciation that it may be desirable to install an array of GPU modules within an information handling system.

Various aspects of the present disclosure include an appreciation that GPU modules are often configured to conform to form factor standards. Various aspects of the present disclosure include an appreciation that the card electromechanical (CEM) form factor standard is one such form factor standard. Various aspects of the disclosure include an appreciation that it is known to provide information handling systems with baseboard systems such as peripheral component interconnect express (PCIe) type baseboard systems. Various aspects of the present disclosure include an appreciation that with certain CEM GPU module configurations, it can be advantageous to provide the baseboard system with a baseboard component, which functions as a processor to peripheral component interconnect express (PCIe) switch.

Various aspects of the present disclosure include an appreciation that server type information handling system structural designs are becoming increasingly large due in part to the structural design of a baseboard system of the information handling system. Various aspects of the present disclosure include an appreciation that structural design of the baseboard system includes a combination of a baseboard circuit board, baseboard slots and components connected to the baseboard circuit board via the baseboard slots. Various aspects of the present disclosure include an appreciation that with many baseboard system designs baseboard components, such as baseboard switches and high speed input/output connectors, are designed to be co-planar (i.e., located on the same side of the circuit board of the baseboard system) to slots, such as PCIe slots, of the baseboard system. Various aspects of the present disclosure include an appreciation that with many baseboard system designs baseboard components, such as baseboard switches and high speed input/output connectors, are designed to be located on a top side of the baseboard circuit board. Various aspects of the present disclosure include an appreciation that it would be desirable to compress the structural design of baseboard systems and GPU modules.

A system and method are disclosed for providing a server type information handling system with an opposing plane interposer system. In certain embodiments, the opposing plane interposer system includes a primary circuit board and a integrated circuit interposer circuit board. In certain embodiments, the primary circuit board includes a plurality of slots installed on a top side of the primary circuit board. In certain embodiments, the integrated circuit interposer circuit board is physically and electrically coupled to an underside of the primary circuit board. In certain embodiments, the integrated circuit interposer circuit board laterally overlaps with the plurality of slots of the primary circuit board.

In certain embodiments, the primary circuit board includes a baseboard circuit board. In certain embodiments, the primary circuit board includes a primary PCIe circuit board. In certain embodiments, the plurality of slots include a plurality of PCIe slots. In certain embodiments, the plurality of PCIe slots are installed on the primary circuit board. In certain embodiments, the plurality of PCIe slots are installed on a top side of the primary PCIe circuit board. In certain embodiments, the primary circuit board includes one or more auxiliary power connections. In certain embodiments, the primary circuit board includes landing pads positioned underneath the PCIe slots. In certain embodiments, the primary circuit board includes logic to service the needs of the PCIe slots. In certain embodiments, the logic to service the needs of the PCIe slots is positioned on a top side of the primary circuit board.

In certain embodiments, one or more baseboard switches are installed on the interposer circuit board. In certain embodiments, the one or more baseboard switches are installed on an underside of the interposer circuit board. In certain embodiments, the one or more baseboard switches are installed coplanar with and aligned vertically with the plurality of slots. In certain embodiments, the one or more switches correspond to PCIe type switches.

In certain embodiments, one or more high speed connectors are installed on the interposer circuit board. In certain embodiments, the one or more high speed connectors are installed on an underside of the interposer circuit board. In certain embodiments, the one or more high speed connectors include respective high speed input/output (HSIO) connectors. In certain embodiments, the one or more HSIO connectors correspond to backplane interconnect type system connectors.

In certain embodiments, the interposer circuit board includes landing pads positioned to interconnect with the landing pads of the primary circuit board. In certain embodiments, the interposer circuit board includes logic to service the needs of the baseboard switches. In certain embodiments, the logic to service the needs of the PCIe slots is positioned on an underside of the interposer circuit board. In certain embodiments, the top side of the integrated circuit interposer board mates with the underside of the primary circuit board. In certain embodiments, the interconnection between the landing pads of the interposer circuit board and the landing pads of the circuit board provide a high speed conduit between the primary circuit board and the interposer board.

Such an opposing plane interposer system advantageously compresses the switch board used in high powered server information handling system designs. Such an opposing plane interposer system advantageously inverts the switches and mates them with the underside of the PCIe slots. Such an opposing plane interposer system advantageously allows for shorter overall switch board implementations and shorter, more supportable high powered server information handling system designs. Such an opposing plane interposer system advantageously enables shorter, more dense AI server system platform designs. Better power routing on primary PCIe board by isolating HSIO. Such an opposing plane interposer system advantageously provides better signal integrity between baseboard switches and the slots served by the baseboard switches.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. In various embodiments, one or both the other subsystems 108 or the network port 110 include an opposing plane interposer system 150. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a blade server type information handling system. As used herein, a blade server type information handling system broadly refers to an information handling system which is physically configured to be mounted within a server rack.

In certain embodiments, the opposing plane interposer system 150 includes a primary circuit board and a integrated circuit interposer circuit board. In certain embodiments, the primary circuit board includes a plurality of slots installed on a top side of the primary circuit board. In certain embodiments, the integrated circuit interposer circuit board is physically and electrically coupled to an underside of the primary circuit board. In certain embodiments, the integrated circuit interposer circuit board laterally overlaps with the plurality of slots of the primary circuit board.

In certain embodiments, the primary circuit board includes a baseboard circuit board. In certain embodiments, the primary circuit board includes a primary PCIe circuit board. In certain embodiments, the plurality of slots include a plurality of PCIe slots. In certain embodiments, the plurality of PCIe slots are installed on the primary circuit board. In certain embodiments, the plurality of PCIe slots are installed on a top side of the primary PCIe circuit board. In certain embodiments, the primary circuit board includes one or more auxiliary power connections. In certain embodiments, the primary circuit board includes landing pads positioned underneath the PCIe slots. In certain embodiments, the primary circuit board includes logic to service the needs of the PCIe slots. In certain embodiments, the logic to service the needs of the PCIe slots is positioned on a top side of the primary circuit board.

In certain embodiments, one or more baseboard switches are installed on the interposer circuit board. In certain embodiments, the one or more baseboard switches are installed on an underside of the interposer circuit board. In certain embodiments, the one or more baseboard switches are installed vertically in line with the plurality of slots. In certain embodiments, the one or more switches correspond to PCIe type switches.

In certain embodiments, one or more high speed connectors are installed on the interposer circuit board. In certain embodiments, the one or more high speed connectors are installed on an underside of the interposer circuit board. In certain embodiments, the one or more high speed connectors include respective high speed input/output (HSIO) connectors. In certain embodiments, the one or more HSIO connectors correspond to backplane interconnect type system connectors.

In certain embodiments, the interposer circuit board includes landing pads positioned to interconnect with the landing pads of the primary circuit board. In certain embodiments, the interposer circuit board includes logic to service the needs of the baseboard switches. In certain embodiments, the logic to service the needs of the PCIe slots is positioned on an underside of the interposer circuit board. In certain embodiments, the top side of the integrated circuit interposer board mates with the underside of the primary circuit board. In certain embodiments, the interconnection between the landing pads of the interposer circuit board and the landing pads of the primary circuit board provide a high speed conduit between the primary circuit board and the interposer board.

Such an opposing plane interposer system advantageously compresses x and/or y dimensions of the switch board used in high powered server information handling system designs. Such an opposing plane interposer system advantageously inverts the switches and mates them with the underside of the PCIe slots. Such an opposing plane interposer system advantageously allows for shorter overall switch board implementations and shorter, more supportable high powered server information handling system designs. Such an opposing plane interposer system advantageously enables shorter, more dense AI server system platform designs. Such an opposing plane interposer system provides better power routing on a primary PCIe board by isolating HSIO. Such an opposing plane interposer system advantageously provides better signal integrity between baseboard switches and the slots served by the baseboard switches.

Figure 2:
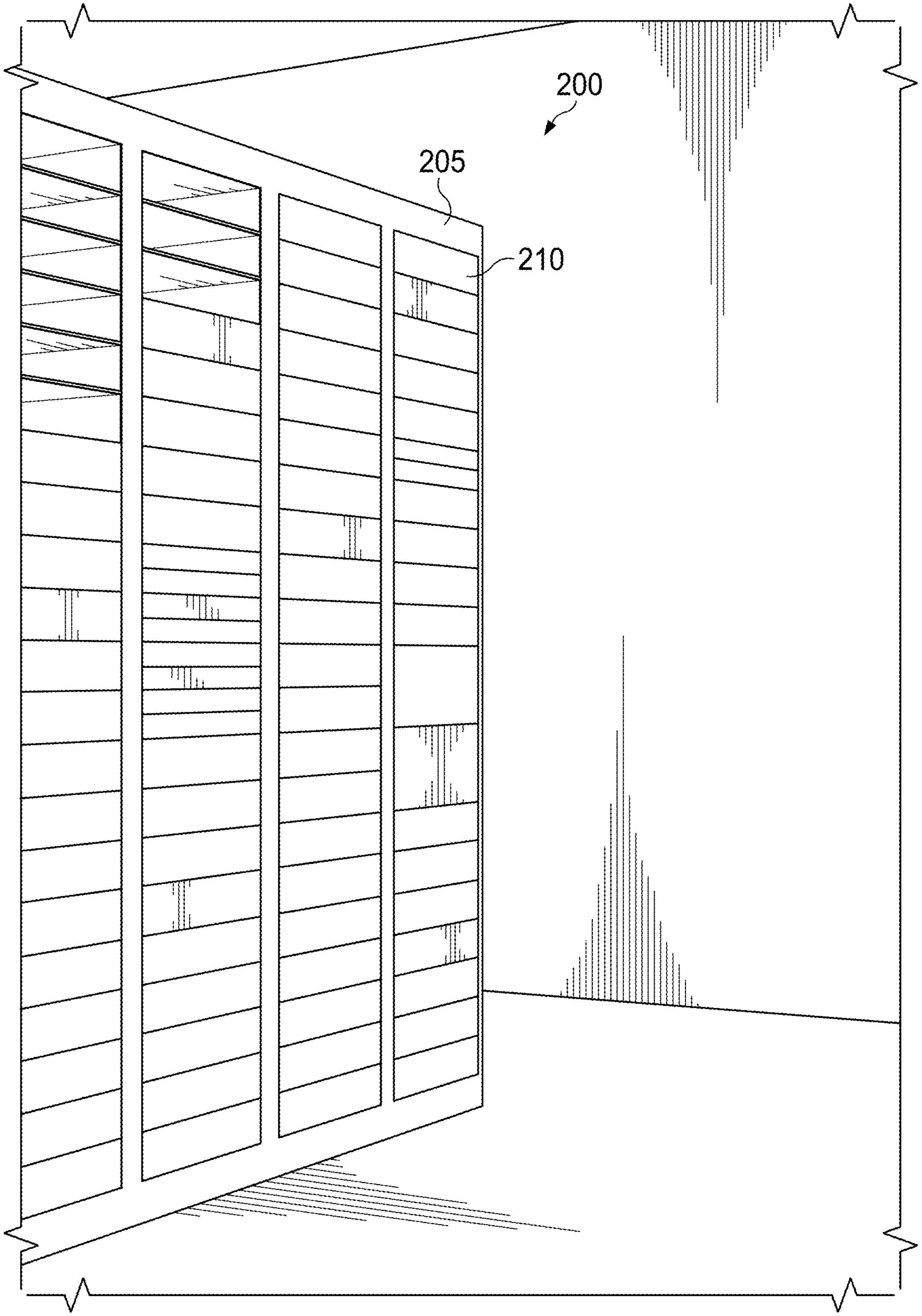
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100, as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks is arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1U rack unit, a 2U rack unit, and a 4U rack unit. In general, a 1U rack unit is substantially (i.e., +/−20%) 1.75" high, a 2U rack unit is substantially (i.e., +/−20%) 3.5" high, and a 4U rack height is substantially (i.e., +/−20%) 7.0" high.

Figure 3:
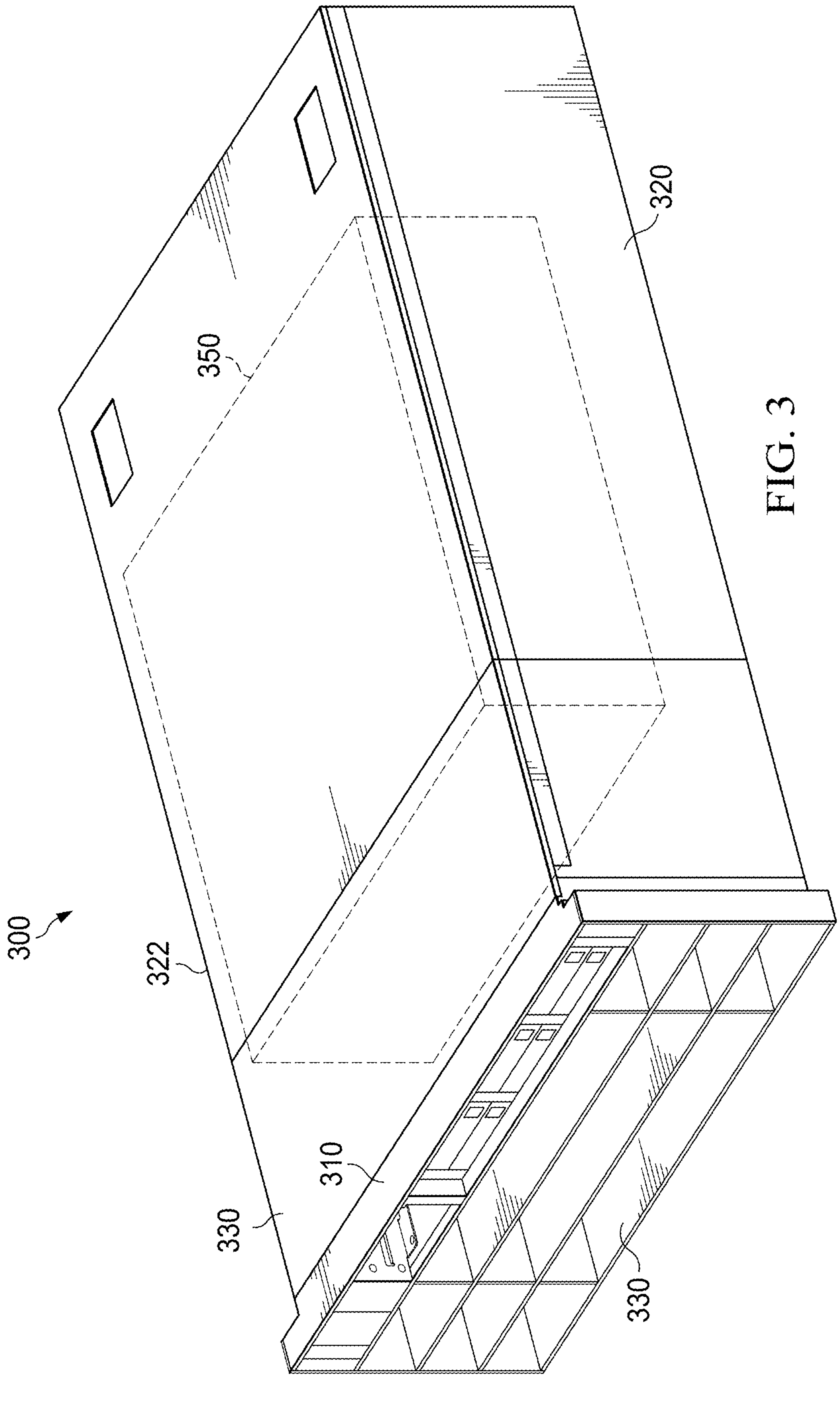
FIG. 3 shows a generalized perspective view of an example server type information handling system.

FIG. 3 shows a generalized perspective view of an example blade server type information handling system 300. In certain embodiments, the server type information handling system includes a front portion 310, which is accessible when the server type information handing system 300 is mounted on a server rack. In certain embodiments, the side portions 320, 322 mount to the rack via respective server mounting components. In certain embodiments, the side portions mount to the rack via respective mechanical guiding features which are mechanically coupled to respective server mounting components. In certain embodiments, the server type information handling system can slide out from the rack via the respective mechanical guiding features. In certain embodiments, internal components of the blade type information handling system 300 may be accessed by removing a top panel 330 of the blade type information handing system 300. In certain embodiments, the blade type information handing system 300 includes a bay 350 via which components may be mounted to the blade type information handling system. In certain embodiments, the server system 300 includes an opposing plane interposer system 350. In certain embodiments, the opposing plane interposer system 350 corresponds to opposing plane interposer system 150.

In certain embodiments, the opposing plane interposer system 150 includes a primary circuit board and a integrated circuit interposer circuit board. In certain embodiments, the primary circuit board includes a plurality of slots installed on a top side of the primary circuit board. In certain embodiments, the integrated circuit interposer circuit board is physically and electrically coupled to an underside of the primary circuit board. In certain embodiments, the integrated circuit interposer circuit board laterally overlaps with the plurality of slots of the primary circuit board.

In certain embodiments, the primary circuit board includes a baseboard circuit board. In certain embodiments, the primary circuit board includes a primary PCIe circuit board. In certain embodiments, the plurality of slots include a plurality of PCIe slots. In certain embodiments, the plurality of PCIe slots are installed on the primary circuit board. In certain embodiments, the plurality of PCIe slots are installed on a top side of the primary PCIe circuit board. In certain embodiments, the primary circuit board includes one or more auxiliary power connections. In certain embodiments, the primary circuit board includes landing pads positioned underneath the PCIe slots. In certain embodiments, the primary circuit board includes logic to service the needs of the PCIe slots. In certain embodiments, the logic to service the needs of the PCIe slots is positioned on a top side of the primary circuit board.

In certain embodiments, one or more baseboard switches are installed on the interposer circuit board. In certain embodiments, the one or more baseboard switches are installed on an underside of the interposer circuit board. In certain embodiments, the one or more baseboard switches are installed coplanar with and aligned vertically with the plurality of slots. In certain embodiments, the one or more switches correspond to PCIe type switches.

In certain embodiments, one or more high speed connectors are installed on the interposer circuit board. In certain embodiments, the one or more high speed connectors are installed on an underside of the interposer circuit board. In certain embodiments, the one or more high speed connectors include respective high speed input/output (HSIO) connectors. In certain embodiments, the one or more HSIO connectors correspond to backplane interconnect type system connectors.

In certain embodiments, the interposer circuit board includes landing pads positioned to interconnect with the landing pads of the primary circuit board. In certain embodiments, the interposer circuit board includes logic to service the needs of the baseboard switches. In certain embodiments, the logic to service the needs of the PCIe slots is positioned on an underside of the interposer circuit board. In certain embodiments, the top side of the integrated circuit interposer board mates with the underside of the primary circuit board. In certain embodiments, the interconnection between the landing pads of the interposer circuit board and the landing pads of the primary circuit board provide a high speed conduit between the primary circuit board and the interposer board.

Figure 4:
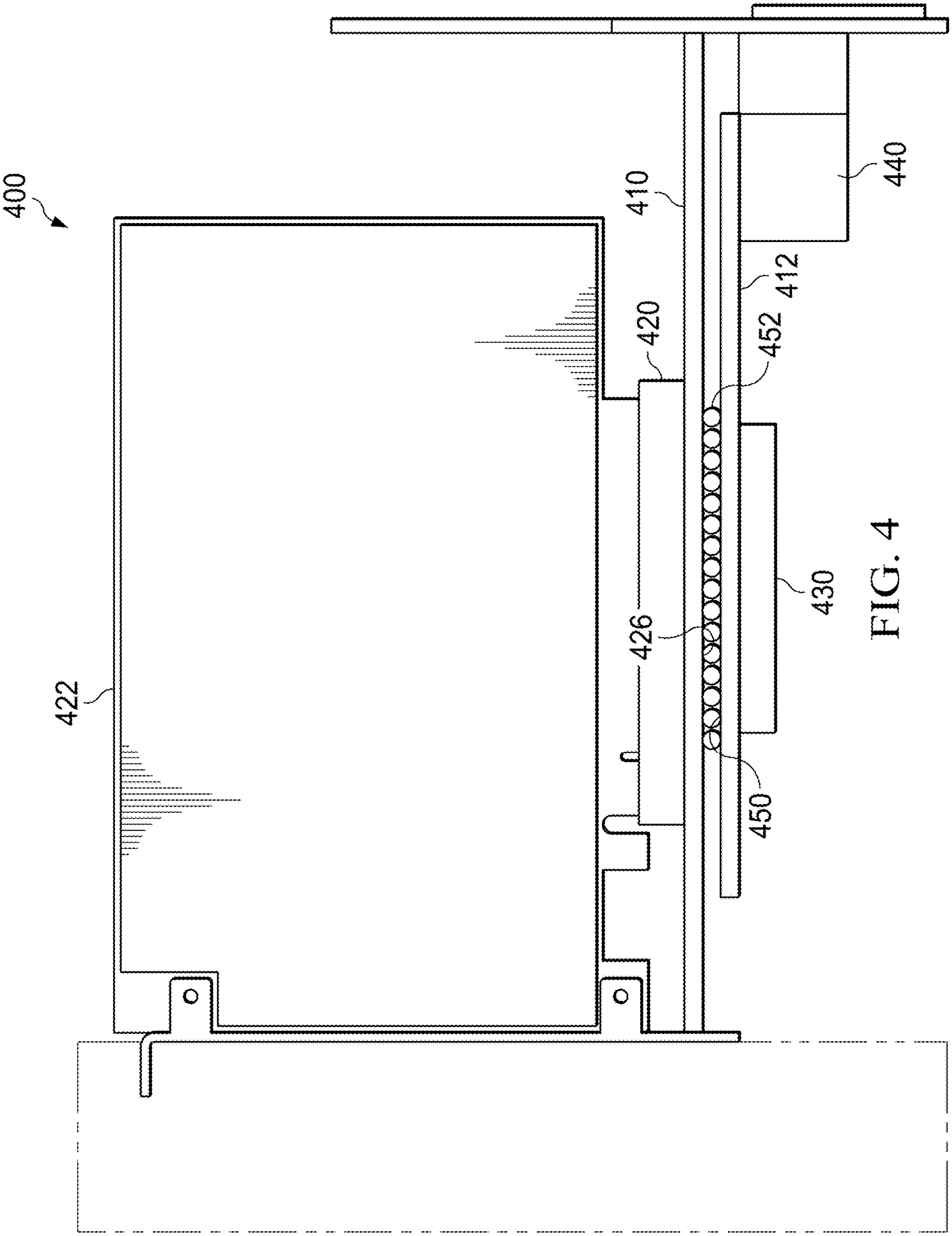
FIG. 4 shows a generalized side view of an opposing plane interposer system.

FIG. 4 shows a generalized side view of an opposing plane interposer system 400. In certain embodiments, the opposing plane interposer system 400 corresponds to opposing plane interposer system 150.

In certain embodiments, the opposing plane interposer system 400 includes a primary circuit board 410 and a integrated circuit interposer circuit board 412. In certain embodiments, the primary circuit board 410 includes a plurality of slots 420 installed on a top side of the primary circuit board. In certain embodiments, the one or more slots 420 are arranged to connect with an array of components. As used herein, an array of components broadly refers to a plurality of information handling system components which are physically arranged substantially (i.e., +/−20%) parallel with each other. In certain embodiments, the array of components includes an array of GPU modules. In certain embodiments, one or more slots 420 each have a corresponding installed component 422. In certain embodiments, each installed component 422 includes a respective GPU module. In certain embodiments, the array of components include an array of GPU modules. In certain embodiments, the integrated circuit interposer circuit board 412 is physically and electrically coupled to an underside of the primary circuit board. In certain embodiments, the integrated circuit interposer circuit board 412 laterally overlaps with the plurality of slots 412 of the primary circuit board.

In certain embodiments, the primary circuit board 410 includes a baseboard circuit board. In certain embodiments, the primary circuit board includes a primary PCIe circuit board. In certain embodiments, the plurality of slots 420 include a plurality of PCIe slots. In certain embodiments, each slot 420 includes a CEM type connector. In certain embodiments, the baseboard circuit board 410 includes 16 PCIe slots. In certain embodiments, the plurality of PCIe slots are installed on the primary circuit board. In certain embodiments, the plurality of PCIe slots are installed on a top side of the primary PCIe circuit board. In certain embodiments, the primary circuit board 410 includes one or more auxiliary power connections. In certain embodiments, the primary circuit 410 board includes a primary landing pad portion 426 installed on a bottom side of the primary circuit board 410. In certain embodiments, the primary landing pad portion 426 is positioned underneath the PCIe slots. In certain embodiments, the primary circuit board includes logic to service the needs of the PCIe slots. In certain embodiments, the logic to service the needs of the PCIe slots is positioned on a top side of the primary circuit board.

In certain embodiments, one or more integrated circuit components 430 are installed on the interposer circuit board 412. In certain embodiments, the one or more baseboard switch components 430 are installed on an underside of the interposer circuit board 412. In certain embodiments, the one or more baseboard switch components 430 are installed coplanar with and aligned vertically with the plurality of slots. In certain embodiments, the one or more switch component 430 corresponds to PCIe type switches.

In certain embodiments, one or more high speed connectors 440 are installed on the interposer circuit board 412. In certain embodiments, the one or more high speed connectors 440 are used to connect the opposing plane interposer system 400 to a backplane of the information handling system. In certain embodiments, the one or more high speed connectors 440 are positioned along a rear edge of the interposer circuit board 412. In certain embodiments, the one or more high speed connectors are installed on an underside of the interposer circuit board. In certain embodiments, the one or more high speed connectors 440 include respective high speed input/output (HSIO) type connectors. In certain embodiments, the one or more HSIO connectors correspond to backplane interconnect type system connectors. In certain embodiments, the HSIO connectors include an Examax type connector.

In certain embodiments, the interposer circuit board 412 includes an interposer landing pad portion 450 positioned to interconnect with the primary landing pad portion 426 of the primary circuit board 410. In certain embodiments, the interposer circuit board 412 includes logic to service the needs of the baseboard switches. In certain embodiments, the logic to service the needs of the PCIe slots is positioned on an underside of the interposer circuit board. In certain embodiments, the top side of the integrated circuit interposer board 412 mates with the underside of the primary circuit board 410.

In certain embodiments, the landing pad portion 426, the landing pad portion 450, or a combination thereof, each include a plurality of respective landing pads. As used herein, a landing pad (also referred to as a pad) broadly refers to an exposed conductive area (often copper) where a component's lead is soldered, thus providing a point of contact between the component and the circuit board. In certain embodiments, each slot 420 has a corresponding arrangement of pads extending from the underside of the baseboard circuit board.

In certain embodiments, the interconnection 452 between the landing pad portion 450 of the interposer circuit board and the landing pad portion 426 of the circuit board provide a high speed conduit between the primary circuit board and the interposer board. In certain embodiments, the interconnection 452 between the landing pad portion 450 of the interposer circuit board and the landing pad portion 426 includes a via field. In certain embodiments, the via field includes a plurality of vias. As used herein, a via broadly refers to an electrical connection between a pad of the landing pad portion 426 and a pad of the landing pad portion 450.

Figure 5A:
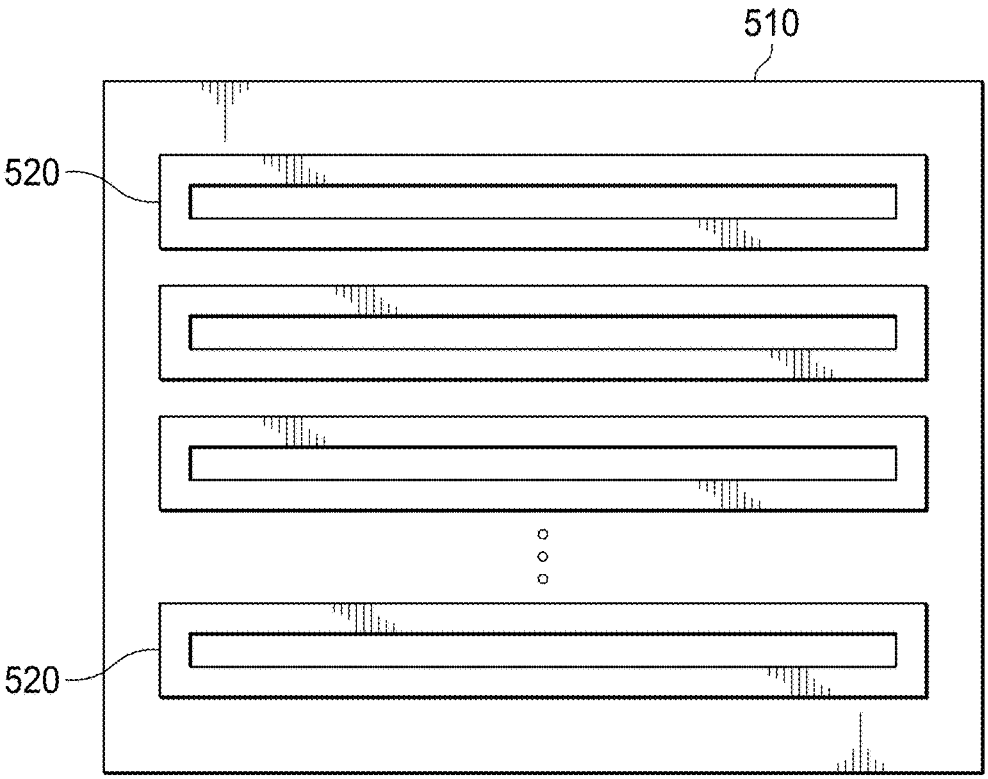
FIGS. 5A, 5B, 5C, 5D and 5E, generally referred to as FIG. 5, show a plurality of views of portions of an opposing plane interposer system.
Figure 5B:
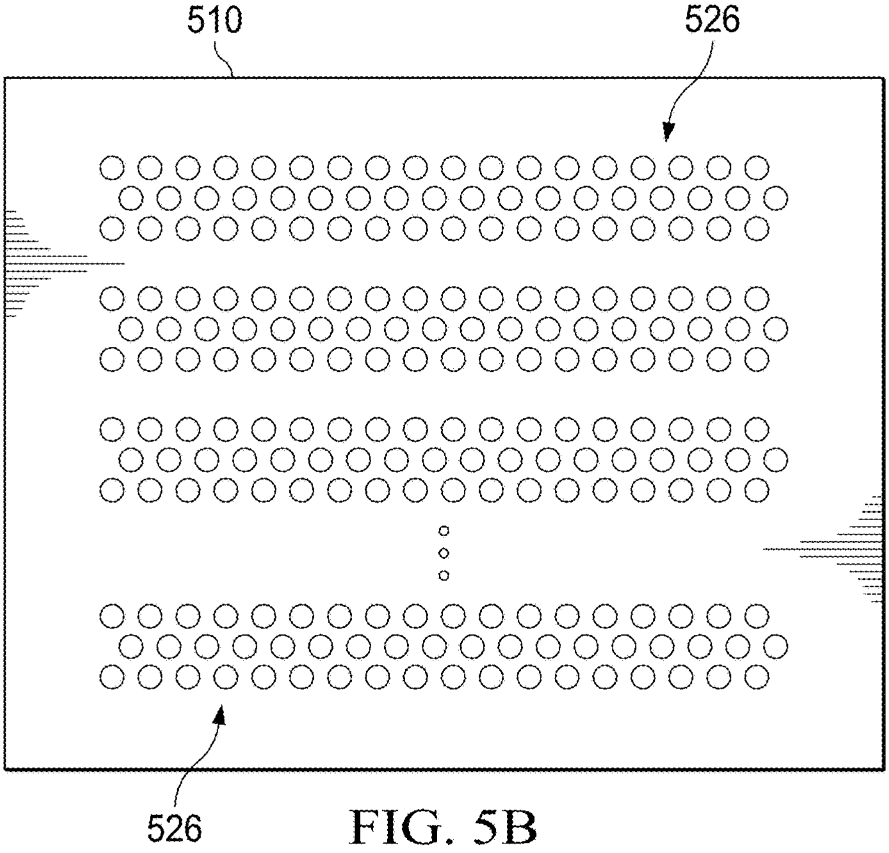
Figure 5C:
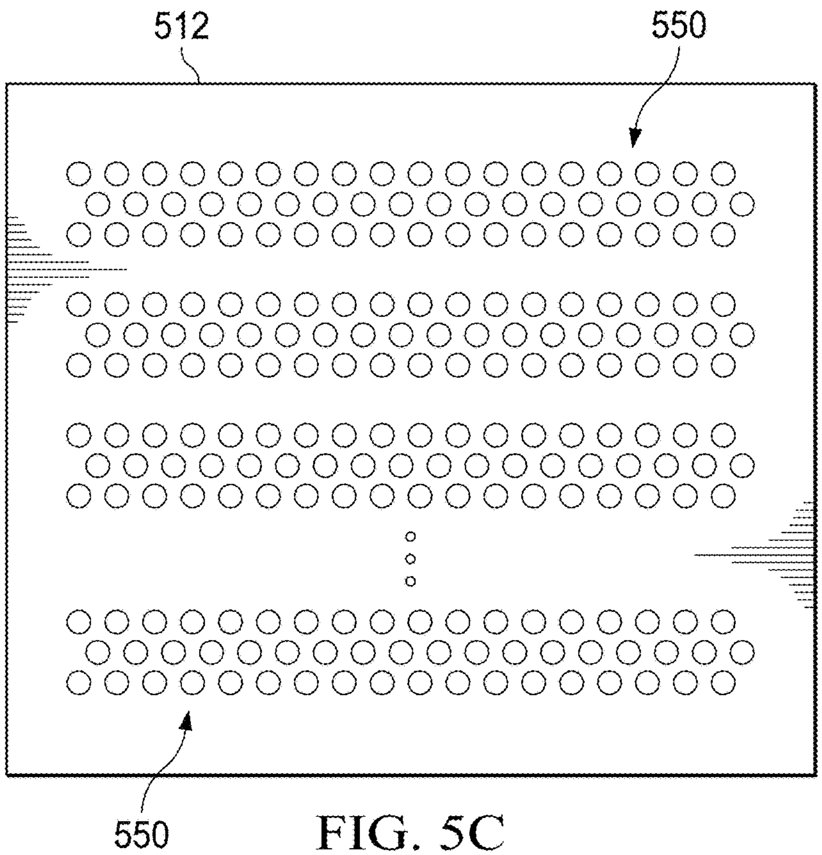
Figure 5D:
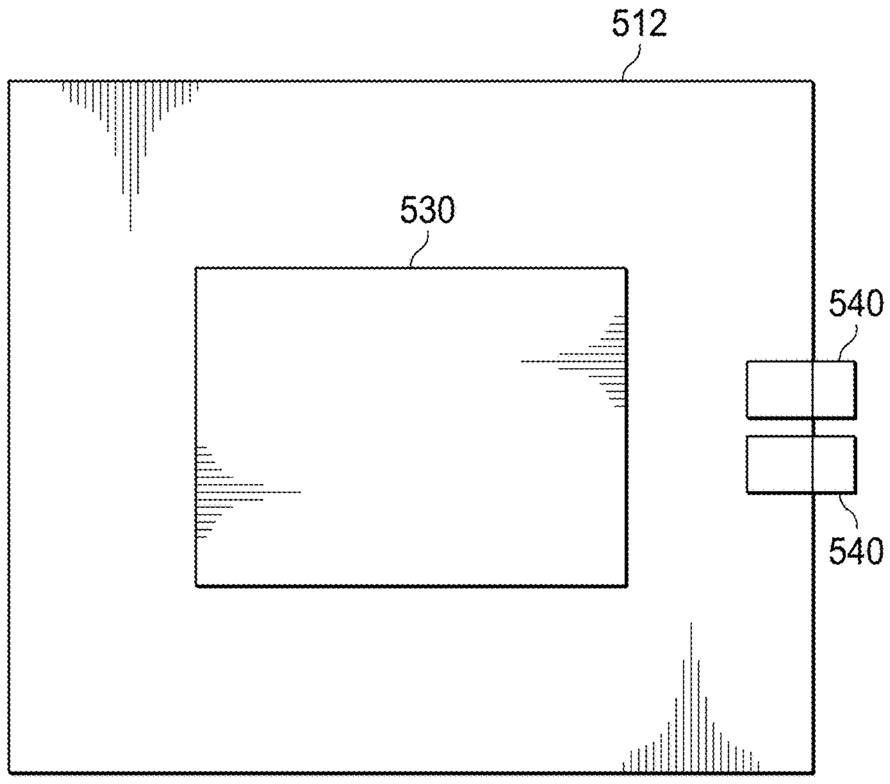
Figure 5E:
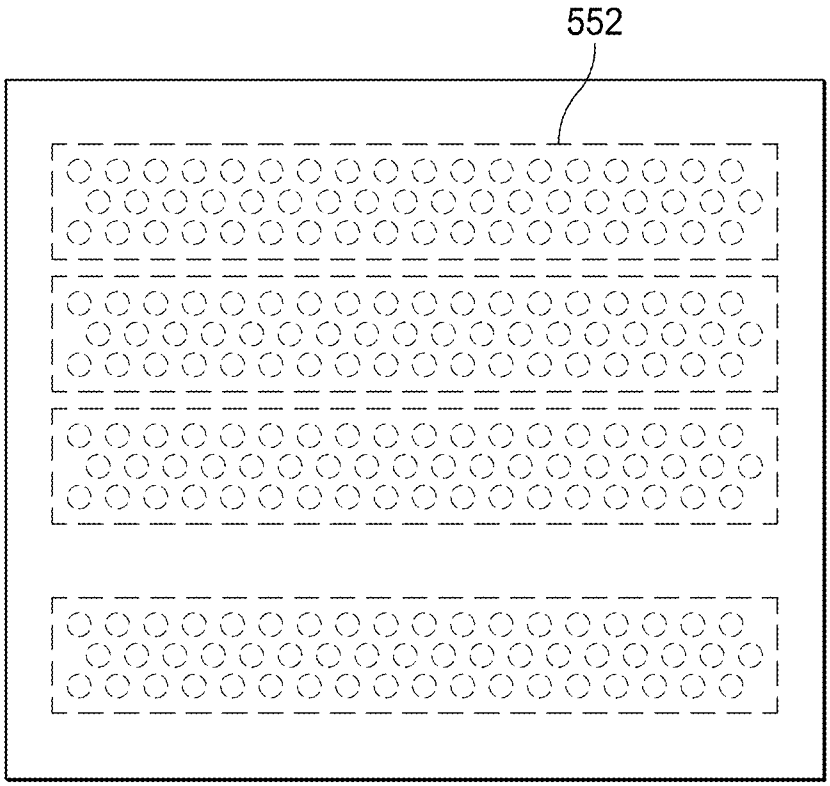

FIGS. 5A, 5B, 5C, 5D and 5E, generally referred to as FIG. 5, show a plurality of views of portions of an opposing plane interposer system 500. More specifically, FIG. 5A shows a top view of a baseboard circuit board portion of an opposing plane interposer system 500. FIG. 5B shows a bottom view of a baseboard circuit board portion of an opposing plane interposer system 500. FIG. 5C shows a top view of an interposer circuit board portion of an opposing plane interposer system 500. FIG. 5D shows a bottom view of an interposer circuit board portion of an opposing plane interposer system 500. FIG. 5E shows a top view of a via field portion of an opposing plane interposer system 500. In certain embodiments, the opposing plane interposer system 500 corresponds to opposing plane interposer system 150.

In certain embodiments, the opposing plane interposer system 500 includes a primary circuit board 510 and a integrated circuit interposer circuit board 512. In certain embodiments, the primary circuit board 510 includes a plurality of slots 520 installed on a top side of the primary circuit board. In certain embodiments, the integrated circuit interposer circuit board 512 is physically and electrically coupled to an underside of the primary circuit board. In certain embodiments, the integrated circuit interposer circuit board 512 laterally overlaps with the plurality of slots 512 of the primary circuit board.

In certain embodiments, the primary circuit board 510 includes a baseboard circuit board. In certain embodiments, the primary circuit board includes a primary PCIe circuit board. In certain embodiments, the plurality of slots 520 include a plurality of PCIe slots. In certain embodiments, the baseboard circuit board 510 includes sixteen PCIe slots. In certain embodiments, the plurality of PCIe slots are installed on the primary circuit board 510. In certain embodiments, the plurality of PCIe slots are installed on a top side of the primary PCIe circuit board 510. In certain embodiments, the primary circuit board 510 includes one or more auxiliary power connections. In certain embodiments, the primary circuit 510 board includes a landing pad portion 526 positioned underneath the PCIe slots. In certain embodiments, the primary circuit board includes logic to service the needs of the PCIe slots. In certain embodiments, the logic to service the needs of the PCIe slots is positioned on a top side of the primary circuit board.

In certain embodiments, one or more integrated circuit components 530 are installed on the interposer circuit board 512. In certain embodiments, the one or more baseboard switch components 530 are installed on an underside of the interposer circuit board 512. In certain embodiments, the one or more baseboard switch components 530 are installed coplanar with and aligned vertically with the plurality of slots. In certain embodiments, the one or more switch component 530 corresponds to PCIe type switches. In certain embodiments, one integrated circuit component 530 is configured to interact with four slots 520.

In certain embodiments, one or more high speed connectors 540 are installed on the interposer circuit board 512. In certain embodiments, the one or more high speed connectors are installed on an underside of the interposer circuit board. In certain embodiments, the one or more high speed connectors 540 include respective high speed input/output (HSIO) connectors. In certain embodiments, the one or more HSIO connectors correspond to backplane interconnect type system connectors. In certain embodiments, one or both high speed connectors 540 are configured to interact with the one or more baseboard switch components 530. In certain embodiments, two high speed connectors 540 are configured to interact with four slots 520.

In certain embodiments, the interposer circuit board 512 includes a landing pad portion 550 positioned to interconnect with the landing pad portion 526 of the primary circuit board 510. In certain embodiments, the interposer circuit board 512 includes logic to service the needs of the baseboard switches. In certain embodiments, the logic to service the needs of the PCIe slots is positioned on an underside of the interposer circuit board. In certain embodiments, the top side of the integrated circuit interposer board 512 mates with the underside of the primary circuit board 510.

In certain embodiments, the landing pad portion 526, the landing pad portion 550, or a combination thereof, each include a plurality of respective landing pads. As used herein, a landing pad (also referred to as a pad) broadly refers to an exposed conductive area (often copper) where a component's lead is soldered, thus providing a point of contact between the component and the circuit board. In certain embodiments, each slot 520 has a corresponding arrangement of pads extending from the underside of the baseboard circuit board.

In certain embodiments, the interconnection 552 between the landing pad portion 550 of the interposer circuit board and the landing pad portion 526 of the circuit board provide a high speed conduit between the primary circuit board and the interposer board. In certain embodiments, the interconnection 552 between the landing pad portion 550 of the interposer circuit board and the landing pad portion 526 includes a via field. In certain embodiments, the via field includes a plurality of vias. As used herein, a via broadly refers to an electrical connection between a pad of the landing pad portion 526 and a pad of the landing pad portion 550.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. An opposing plane interposer system for use with an information handling system, comprising:

a primary circuit board, the primary circuit board including a plurality of slots and a primary landing pad portion, the plurality of slots being installed on a top side of the primary circuit board, the primary landing pad portion being installed on a bottom side of the primary circuit board; and, an integrated circuit interposer circuit board, the integrated circuit interposer circuit board including an integrated circuit component and an interposer landing pad portion, the integrated circuit component being installed on a bottom side of the integrated circuit interposer circuit board, the interposer landing pad portion being installed on a top side of the integrated circuit interposer circuit board, the top side of the integrated circuit interposer circuit board mating with the bottom side of the primary circuit board interposer landing pad portion; and wherein the integrated circuit component is installed on the bottom side of the integrated circuit interposer circuit board coplanar with and aligned vertically with the plurality of slots.

2. The opposing plane interposer system of claim 1, wherein:

the integrated circuit interposer circuit board further includes a high speed connector, the high speed connector being positioned along a rear edge of the integrated circuit interposer circuit board.

3. The opposing plane interposer system of claim 2, wherein:

the high speed connector includes a high speed input/output (HSIO) type connector.

4. The opposing plane interposer system of claim 1, wherein:

the plurality of slots include a respective plurality of peripheral component interconnect express (PCIe) type connectors.

5. The opposing plane interposer system of claim 1, wherein:

the plurality of slots are arranged to connect with an array of components and, the plurality of slots are arranged to connect with the array of components.

6. The opposing plane interposer system of claim 5, wherein:

the integrated circuit component comprises a baseboard switch component;

the array of components includes an array of graphics processing unit (GPU) modules; and, the baseboard switch component is installed coplanar with and aligned vertically with the array of GPU modules.

7. A baseboard system for an information handling system comprising:

a plurality of components; and, an opposing plane interposer system, the opposing plane interposer system comprising a primary circuit board, the primary circuit board including a plurality of slots and a primary landing pad portion, the plurality of slots being installed on a top side of the primary circuit board, each of the plurality of components being installed on respective slots of the plurality of slots, the primary landing pad portion being installed on a bottom side of the primary circuit board; and, an integrated circuit interposer circuit board, the integrated circuit interposer circuit board including an integrated circuit component and an interposer landing pad portion, the integrated circuit component being installed on a bottom side of the integrated circuit interposer circuit board, the interposer landing pad portion being installed on a top side of the integrated circuit interposer circuit board, the top side of the integrated circuit interposer circuit board mating with the bottom side of the primary circuit board interposer landing pad portion; and wherein the integrated circuit component is installed on the bottom side of the integrated circuit interposer circuit board coplanar with and aligned vertically with the plurality of slots.

8. The bottom system of claim 7, wherein:

the integrated circuit interposer circuit board further includes a high speed connector, the high speed connector being positioned along a rear edge of the integrated circuit interposer circuit board.

9. The bottom system of claim 8, wherein:

the high speed connector includes a high speed input/output (HSIO) type connector.

10. The bottom system of claim 7, wherein:

the plurality of slots include a respective plurality of peripheral component interconnect express (PCIe) type connectors.

11. The bottom system of claim 7, wherein:

the plurality of components include an array of components; and, the plurality of slots are arranged to connect with the array of components.

12. The bottom system of claim 11, wherein:

the integrated circuit component comprises a baseboard switch component;

the array of components includes an array of graphics processing unit (GPU) modules; and, the baseboard switch component is installed coplanar with and aligned vertically with the array of GPU modules.

13. A system comprising:

a chassis;

a processor contained within the chassis;

a data bus coupled to the processor; and, a plurality of components contained within the chassis; and, an opposing plane interposer system, the opposing plane interposer system comprising a primary circuit board, the primary circuit board including a plurality of slots and a primary landing pad portion, the plurality of slots being installed on a top side of the primary circuit board, each of the plurality of components being installed on respective slots of the plurality of slots, the primary landing pad portion being installed on a bottom side of the primary circuit board; and, an integrated circuit interposer circuit board, the integrated circuit interposer circuit board including an integrated circuit component and an interposer landing pad portion, the integrated circuit component being installed on a bottom side of the integrated circuit interposer circuit board, the interposer landing pad portion being installed on a top side of the integrated circuit interposer circuit board, the top side of the integrated circuit interposer circuit board mating with the bottom side of the primary circuit board interposer landing pad portion; and wherein the integrated circuit component is installed on the bottom side of the integrated circuit interposer circuit board coplanar with and aligned vertically with the plurality of slots.

14. The system of claim 13, wherein:

the integrated circuit interposer circuit board further includes a high speed connector, the high speed connector being positioned along a rear edge of the integrated circuit interposer circuit board.

15. The system of claim 14, wherein:

the high speed connector includes a high speed input/output (HSIO) type connector.

16. The system of claim 13, wherein:

the plurality of slots include a respective plurality of peripheral component interconnect express (PCIe) type connectors.

17. The system of claim 13, wherein:

the plurality of components include an array of components; and, the plurality of slots are arranged to connect with the array of components.

18. The system of claim 17, wherein:

the integrated circuit component comprises a baseboard switch component;

the array of components includes an array of graphics processing unit (GPU) modules; and, the baseboard switch component is installed coplanar with and aligned vertically with the array of GPU modules.

* * * * *